(12) United States Patent
Agosín Trumper et al.

(10) Patent No.: US 11,236,295 B2
(45) Date of Patent: Feb. 1, 2022

(54) AROMA RECOVERY METHOD AND SYSTEMS FROM FERMENTATION VATS

(71) Applicants: PONTIFICIA UNIVERSIDAD CATÓLICA DE CHILE, Santiago (CL); SOCIEDAD ANÓNIMA VIÑA SANTA RITA, Santiago (CL)

(72) Inventors: Eduardo Esteban Agosín Trumper, Santiago (CL); José Ricardo Pérez Correa, Santiago (CL); Marianna Celeste Delgado Gómez, Santiago (CL); Chloé Capitaine, Santiago (CL); Álvaro Javier Lezaeta Valenzuela, Santiago (CL); Eduardo Andrés Alemparte Benavente, Santiago (CL); José Miguel Benavente Pereira, Santiago (CL); Jorge Alberto Heiremans Bunster, Santiago (CL)

(73) Assignees: PONTIFICIA UNIVERSIDAD CATÓLICA DE CHILE, Santiago (CL); SOCIEDAD ANÓNIMA VIÑA SANTA RITA, Santiago (CL)

( * ) Notice: Subject to any disclaimer, the term of this patent is extended or adjusted under 35 U.S.C. 154(b) by 0 days.

(21) Appl. No.: 16/475,334

(22) PCT Filed: Dec. 20, 2017

(86) PCT No.: PCT/CL2017/050079
§ 371 (c)(1),
(2) Date: Jul. 1, 2019

(87) PCT Pub. No.: WO2018/119532
PCT Pub. Date: Jul. 5, 2018

(65) Prior Publication Data
US 2019/0338226 A1    Nov. 7, 2019

(30) Foreign Application Priority Data

Dec. 29, 2016  (CL) .................................. 3385-2016

(51) Int. Cl.
*C12F 3/04*         (2006.01)
*A23L 27/24*        (2016.01)
(Continued)

(52) U.S. Cl.
CPC ................ *C12F 3/04* (2013.01); *A23L 27/24* (2016.08); *C12F 3/06* (2013.01); *C12G 1/02* (2013.01);
(Continued)

(58) Field of Classification Search
CPC ....... C12F 3/04; C12F 3/06; C12F 3/00–3/10; A23L 27/24; A23L 2/52–2/84;
(Continued)

(56) References Cited

U.S. PATENT DOCUMENTS 2,371,208 A * 3/1945 Alzola ...................... C12P 7/14
                                                        435/162
2,536,994 A * 1/1951 Cremaschi ............... C12G 1/02
                                                         426/15
(Continued)

FOREIGN PATENT DOCUMENTS

CN    102 645 502 A      8/2012
FR    2459280 A1 *       1/1981 ................ C12F 3/04
FR    2 617 184 A1       12/1988

OTHER PUBLICATIONS

International Search Report (ISR) for International Application No. PCT/CL2017/050079, dated Mar. 26, 2018.
(Continued)

*Primary Examiner* — Drew E Becker
(74) *Attorney, Agent, or Firm* — Ladas & Parry LLP

(57) ABSTRACT

The present invention consist of an aroma recovery system in an installation with a plurality of fermentation vats for
(Continued)

preparing beverages such as white wine, red wine, beers and juices to apply a method of recovering aroma from said fermentation vats; said system comprises at least one connection system, and at least one aroma recovery equipment, wherein said connection system comprises control means such a logic controller (PLC). It is also provided a multiple connection system for connecting said plurality of fermentation vats and said aroma recovery equipment by automatic valves and a method of recovering aroma from fermentation vats of a beverage such as, for example, white wine, red wine, beer and juices.

7 Claims, 5 Drawing Sheets

(51) Int. Cl.
C12F 3/06 (2006.01)
C12G 1/02 (2006.01)
C12G 3/06 (2006.01)
(52) U.S. Cl.
CPC ............ *C12G 3/06* (2013.01); *A23V 2002/00* (2013.01); *C12G 2200/21* (2013.01)
(58) Field of Classification Search
CPC ........ C12G 1/02; C12G 3/06; C12G 2200/21; C12G 1/005; C12G 3/02–3/026; C12G 3/08; C12C 11/00–11/11; C12H 1/22
See application file for complete search history.

(56) References Cited

U.S. PATENT DOCUMENTS

| | | | | |
|---|---|---|---|---|
| 3,449,128 A * | 6/1969 | Hayashi | ................... | C12F 3/04 426/11 |
| 3,477,443 A * | 11/1969 | Hayashi | ................. | A24B 15/40 131/276 |
| 3,486,437 A * | 12/1969 | Bazhenov | ................ | C12G 1/02 99/276 |
| 3,526,509 A * | 9/1970 | Hayashi | .................... | C12F 3/04 426/533 |
| 3,852,477 A * | 12/1974 | Venter | ...................... | C12G 3/06 426/15 |
| 4,908,219 A * | 3/1990 | Modot | ..................... | C12G 1/02 426/15 |
| 4,959,228 A * | 9/1990 | Skrgatic | ................... | G01N 9/24 426/11 |
| 8,794,049 B1 * | 8/2014 | Norkin | ................... | C12M 41/40 73/37 |
| 2003/0097937 A1 * | 5/2003 | Francia | ................ | C12G 1/0216 99/275 |
| 2006/0080274 A1 * | 4/2006 | Mourad | .................. | G06Q 30/02 |
| 2007/0071860 A1 * | 3/2007 | Didzbalis | ............ | A23L 27/2052 426/534 |
| 2010/0047422 A1 * | 2/2010 | Magalhaes Mendes | .. | A23L 2/56 426/494 |
| 2012/0269925 A1 * | 10/2012 | Farotto | .............. | G05B 13/0275 426/15 |
| 2014/0251835 A1 * | 9/2014 | Mitchell | ............... | C12G 1/0203 205/787 |
| 2015/0046471 A1 * | 2/2015 | Tompkins | ............ | G01N 33/146 707/748 |
| 2016/0073673 A1 * | 3/2016 | Schuh | ...................... | C12G 3/06 426/74 |
| 2016/0195292 A1 * | 7/2016 | Boulbes | .................. | F25D 29/00 236/44 C |
| 2016/0326473 A1 * | 11/2016 | Thurnheer | ............ | B01D 3/002 |
| 2016/0355770 A1 * | 12/2016 | Norkin | ..................... | C12G 3/02 |
| 2017/0029752 A1 * | 2/2017 | Mitchell | ............... | C12C 11/003 |
| 2019/0330578 A1 * | 10/2019 | Perez Correa | ........... | C12G 3/06 |

OTHER PUBLICATIONS

Written Opinion (WO) for International Application No. PCT/CL2017/050079, dated Mar. 26, 2018.

* cited by examiner

AROMA RECOVERY METHOD AND SYSTEMS FROM FERMENTATION VATS

RELATED APPLICATION

This application is a national phase entry under 35 USC 371 of International Patent Application No.: PCT/CL2017/050079 filed on 20 Dec. 2017, which claims priority from Chile Application No. 3385-2016 filed on 29 Dec. 2016, the disclosures of which are incorporated in their entirety by reference herein.

FIELD

The present invention relates to the food industry, in particular to the flavor and aroma industry, for example with the recovery of flavors from musts fermentations, for example, during a wine or brewery production.

BACKGROUND

Wine is a distinctive product whose quality is determined by the presence of hundreds of odorant molecules, most of which come from grapes and alcoholic fermentation. Up to 40 of the odorant compounds are lost during the traction fermentation caused by carbon dioxide. Some of the measures that are taken industrially to minimize aromatic losses, such as fermentation at low temperatures, have a negative effect on the production process, for example, an increase of 25% in the average fermentation time and 30% in energy sources.

The aroma of wine is one of the intrinsic factors that most influence its quality and its acceptance by consumers. Wine is a complex product in aromatic terms. Volatile compounds are defined by more than 800 molecules in very low concentrations; of these molecules, 8-10% have odorant capacity and make up the aroma of wine. The aromas of wine come mainly from three sources: grape (varietal aromas), fermentation (fermentative aromas) or aging. The odorant molecules correspond to alcohols, esters, aldehydes, ketones, acids, terpenes, phenols and sulfur compounds in various concentrations. Not all of these compounds contribute to improving the aromatic quality of the wine. However, some compounds of varietal origin contribute positively, if found in suitable concentrations. For example, thiol compounds such as 3-mercaptohexanol (3MH), 4-methyl-4-mercapto-2-pentanone (4MMP) and 3-mercaptohexanol acetate (Ac3MH) provide tropical and fruit notes (grapefruit, passion fruit, among others), which are highly appreciated by consumers of white wine.

The fermentative process is of particular interest because during fermentation many of these compounds are produced, released into the gas phase and lost. Alcoholic fermentation consists of a process in which the sugars present in the must (mainly glucose and fructose) are converted mainly to ethyl alcohol and carbon dioxide. The fermentation process is carried out by yeast species *Saccharomyces cerevisiae*. During this process, generated carbon dioxide ($CO_2$) (50 L $CO_2$/L of must) entrains a substantial amount of aromas from the fermenting must, which means a loss of aromatic wine quality.

A number of studies have focused on quantifying the aromatic loss during the fermentation process since the late 1980s. At the beginning of the 1990s the first signs were found that 25% of the esters and acetates produced were carried by carbon dioxide.

More recently, it has been determined that 56% ethyl hexanoate and 34% of isoamyl acetate are entrained by the $CO_2$ when conditions simulate a fermentation of red wine (28-35° C.). Even at moderate temperature of 20° C., typically for fermentations of white wine, 40% ethyl hexanoate and 21% of isoamyl acetate were dragged by $CO_2$.

The possibility of recovering these lost aromas is of particular importance on the one hand for the wine producers (or beer), but it is also extremely important for the flavor and aroma industry, and for the food and drink industry.

The wine industry is aware of the significant losses that may occur aroma drag $CO_2$. Hence the fermentations for the production of white wines are carried out at low temperatures (between 8 and 15° C.). At lower temperatures, specific growth rate of the yeast is greatly reduced and, consequently, the specific rate of glucose consumption and, thereby, the specific rate of $CO_2$ generation is reduced. Consequently the total quantity of $CO_2$ generated is markedly inferior, and therefore the steam stripping is markedly reduced; which gives rise to superior wines in terms of aromatic quality. However, this practice results in several threats to the winery as the increased risk of problematic fermentations, a significant increase in fermentation time and a significant increase in energy expenditure as frigories. In fact, the prolongation of the fermentation time can reduce by about 30% the effective productive capacity of the winery.

PRIOR ART

Within the prior art, it is the process of aroma recovery described in the document U.S. Pat. No. 4,908,219; which describes, in a fermentation process, a condensation carried out on the $CO_2$ emitted in the process. This condensation is carried out in fractions and in at least two successive stages, at temperatures of about −5 to −15° C. in the first stage, and of about −15 to −50° C. in the second stage. This process is used to improve the quality and quantity of the product in fermentation, in particular of a wine, reintroducing the aromas captured in the wine under fermentation.

Another process is described in document U.S. Pat. No. 2,536,994 and it consists of a continuous wine fermentation process, where at least a substantial part of the vapors and gases formed during the fermentation are recovered. After separating the carbon dioxide, the remains of a mixture of several evaporated components comprising alcohols, essential oils, volatile acids, and aldehydes among others are recovered and recycled in the fermentation vat to obtain a wine of better quality.

However, the inventors have observed that the aromatic compounds change according to the fermented and multiple variable strains of the fermenting must, in particular their temperature and density, generating a complex and changing set of aromas and flavors, which are mixed in a single extract or they are all recycled without any distinction.

Technical Problem

There is a need to categorize the aromatic compounds entrained by the exhausted gases from the liquid of fermentation vats, for example, depending on the density of the liquid, to separately use different aromatic compounds depending on different aromatic requirements, such as changing the aroma and flavor of a wine of a particular strain, or of a wine prepared at a given temperature of fermentation.

Technical Solution

The present invention provides a method and systems for extracting different groups of aromatic compounds from fermentation vats according to the density of the liquid within the vat; Providing a useful tool in predictably preparing beverages, alcoholic beverages and the like.

Advantages of the Invention

The present invention enables the aromatic profile of an alcoholic beverage to be changed in a predictable and programmed manner to obtain the desired aromatic profile. Allowing making wines and other drinks like juices and beers, in a manner designed and tailored to a target audience.

The present invention also allows, for example, fermenting a wine at higher temperatures without losing the quality of the wine, increasing by 25% the productive capacity of a winery with a 30% energy saving. In addition, the generated aromatic fractions have an important appealing, both for the wine industry and for the industry of aromas and flavors.

SUMMARY

It is an object of the present invention to provide an aroma recovery system in an installation with a plurality of fermentation vats for preparing beverages such as white wine, red wine, beers and juices to apply a method of recovering aroma from said fermentation vats; said system comprises at least one connection system for transporting fluids connected to the gas outlet of said fermentation vats, and at least one aroma recovery equipment connected to said connection system and connected to at least one vessel for storing aromas, wherein said connection system comprises control means connected to said plurality of fermentative tanks automatic valves and such a logic controller (PLC) for actuating said automatic valves according to the density of the liquid in said fermentation vats, the amount of $CO_2$ gas emitted by the liquid in said fermentation vats or the pressure in said fermentation vats.

Another object of the present invention is a multiple connection system for connecting said plurality of fermentation vats and said aroma recovery equipment by automatic valves, said automatic valves being controlled by control means, such as a logic programmer (PLC) for actuating said automatic valves according to the density of the liquid in said fermentation vats, the amount of $CO_2$ gas emitted by the liquid in said fermentation vats or the pressure in said fermentation vats.

A further object of the present invention is a method of recovering aroma from fermentation vats of a beverage such as, for example, white wine, red wine, beer and juices, comprising providing an aromatic characterization of said beverage according to ranges of densities of the liquid within said fermentation vats; connecting through a multiple connection system a plurality of fermentation vats to at least one aroma recovery equipment; measuring the density of the liquid in each fermentation vat; choosing a predetermined range of liquid density according to said aromatic characterization for said beverage; selecting a set of fermentation vats with a liquid density within said predetermined range; feeding each aroma recovery equipment with the gas produced in said set of selected tanks by actuating the multiple connection system of the fermentation vats; storing the aroma recovered by each aroma recovery equipment in at least one vessel; labeling said at least one vessel according to said aromatic characterization and repeating steps c) to e).

DETAILED DESCRIPTION OF THE INVENTION

The present invention consists of an aroma recovery system in an installation with a plurality of fermentation vats for preparing beverages such as white wine, red wine, beers and juices, for applying a method of recovering aroma from said fermentation vats, said system comprising:
- at least one connection system for conveying fluids, connected to the gas outlet of said fermentation vats;
- at least one aroma recovery device connected to said connection system and connected to at least one barrel for storing aromas, wherein said connection system comprises automatic valves connected to said plurality of fermentation vats and a control means such as, for example, a programmable logical control (PLC) configured to drive said automatic valves according to the density of the liquid in said fermentation vats, the amount of $CO_2$ gas emitted by the liquid in said fermentation vats, or the pressure in said fermentation vats.

According to a preferred aspect of the invention, said multiple connection system for connecting a plurality of fermentation vats to at least one aroma recovery equipment comprises:
- at least one trunk of conduits for conveying fluids, with automatic valves at each end of said conduits, connected to said plurality of fermentation vats and an automatic overpressure valve at the end connected to said at least one aroma recovery equipment;
- a programmable logical control (PLC) that is configured to control said automatic valves according to the density of the liquid in said fermentation vats, the amount of $CO_2$ gas emitted by the liquid in said fermentation vats or the pressure in said fermentation vats.

Figure 2:
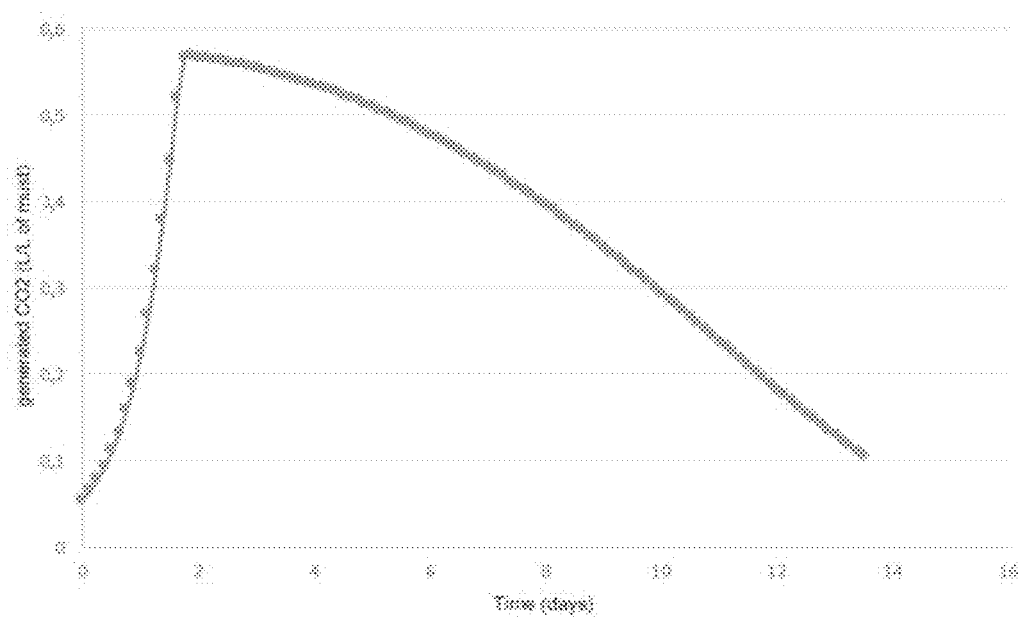
FIG. 2 illustrates a graph of $CO_2$ generation in a fermentation vat as a function of time, when a liquid fermented in said vat.

Moreover, during the operation of a aroma recovery equipment and as illustrated in FIG. 2 for an example applied to a must of a white wine, a peak flow of $CO_2$ is observed from the fermentation of the must in fermentation vats, that $CO_2$ peak is instant, and then the $CO_2$ generation is considerably reduced, lowering the load of the aroma recovery equipment, which allows to observe an idle capacity of the aroma recovery equipment for their capacity of refrigeration. This idle capacity is shown in FIG. 3.

According to a preferred aspect of the invention, said logic control programmer (PLC) is configured to open an automatic valve a fermentation vat connected to the multiple connection system, to extract aromas through the aroma recovery system, subsequently to measuring a $CO_2$ peak generation and subsequent $CO_2$ generation reduction in a fermentation vat also connected to the multiple connection system and aroma are extracted by the aroma recovery system.

Figure 3:
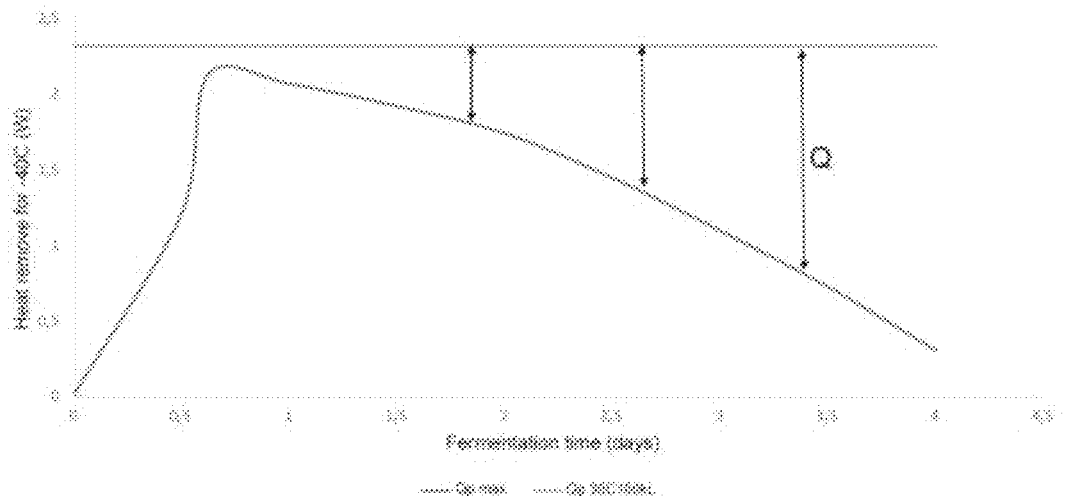
FIG. 3 illustrates, in a graph, an idle capacity of an aroma recovery equipment and connection system according to the state of the art, for extracting heat from a fermentation vat, in an aroma recovery condenser at −40° C., over time.
Figure 4:
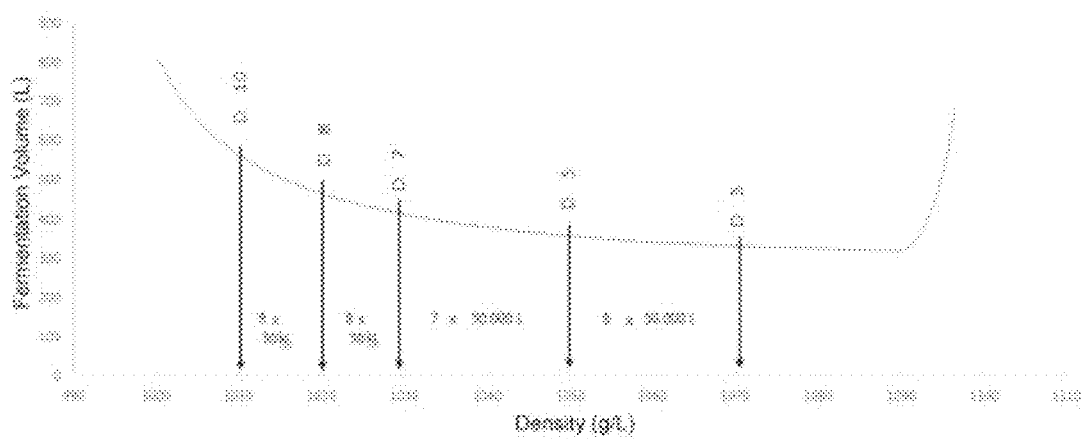
FIG. 4 illustrates, in a graph, the maximum fermentative volume that can be connected to a flavor recovery equipment over time and according to the density of the fermenting must, due to the aroma recovery system and connection system according to the present invention, and applied to a white wine must fermenting at 15° C.

Additionally and as illustrated in FIG. 3 for an example applied to a must of a white wine, a maximum volume or liquid capacity in fermentation is observed as a function of the density of the liquid in the fermentation vats that can be connected to the aroma recovery system according to the invention.

According to a preferred aspect of the invention, said logic control programmer (PLC) is configured to open an automatic valve a fermentation vat connected to the multiple connection system, to extract aromas through the aroma recovery system subsequently to measuring a liquid density in one or more fermentation vats also connected to the multiple connection system and in which aromas are already drawn by the aroma recovery system.

According to a preferred aspect of the invention, said multiple connection system further comprises a plurality of food grade silicone sheets, which are disposed in the upper port of each fermentation vat, which is connected to the multiple connection system. These silicone sheets allow the sealing of vats and prevent leakage of $CO_2$. The sheets are sanitized and are simply installed on the port of each vat and then the lid and butterfly nut of the vat is tightened.

According to a preferred aspect of the invention, said silicone sheets are of dimensions of about 80×80 cm and a thickness of about 3.2 mm.

According to a preferred aspect of the invention, said conduits of the connection system consist of reinforced food grade silicone hose, such as, for example, Enoflex® hoses.

According to a preferred aspect of the invention, said connecting system comprises connectors at the ends of the conduits, connecting the fermentation vats, wherein said connectors are made of stainless steel, with a first camlock type terminal at the end connected to the conduit, and with a second end coated with food grade silicone through a high pressure clamp, at the other end connected to the fermentation vat, the connector further comprises an overpressure relief valve in the event of an emergency, said overpressure relief valve is set, for example, around 1 psi (6.895 kPa).

According to a preferred aspect of the invention, said at least one vessel is a vessel, which maintains darkness and allows the oxygen to be released, preferably said vessel is a barrel, preferably a Kegs Brewers kind of barrel. According to another aspect of the invention, said vessel is a wooden barrel or a glass bottle.

The present invention also consists of a method of recovering aroma from fermentation vats for preparing a beverage, such as white wine, red wine, beer and juices, comprising the following steps:
 a) providing an aromatic characterization of said beverage according to ranges of densities of the liquid within said fermentation vats;
 b) connecting by means of a multiple connection system a plurality of fermentation vats to at least one aroma recovery equipment;
 c) measuring the density of the liquid in each fermentation vat;
 d) choosing a predetermined range of liquid density according to said aromatic characterization for said beverage;
 e) selecting a set of vats of said plurality of fermentation vats having a liquid density contained within said predetermined range of liquid density;
 f) feeding each aroma recovery equipment with the gas produced in said set of selected vats by actuating the multiple connection system of the fermentation vats;
 g) storing the aroma recovered by each aroma recovery equipment in at least one vessel;
 h) labeling said at least one vessel according to said aromatic characterization; and repeat steps c) to e).

According to a preferred aspect of the invention, the step of providing said aromatic characterization; comprises the steps of:
 a. connecting an aroma recovery equipment to one of said fermentation vats with said liquid for preparing a beverage;
 b. connecting a vessel for storing aromas to said aroma recovery equipment;
 c. measuring the density of the liquid in said fermentation vat over a certain period of time;
 d. extracting the gas produced by the fermentation of the liquid in said fermentation vat with said aroma recovery equipment,
 e. storing in said aroma storage vessel the aroma recovered by said aroma recovery equipment while the density of the liquid is maintained in a density range of said liquid, said vessel being labeled with said liquid density range;
 f. repeating steps c) to e) until the density of said liquid reaches a next density range, withdrawing the vessel connected to said aroma recovery apparatus and connecting a next vessel for storing aromas to said aroma recovery apparatus;
 g. storing the aroma recovered by said aroma recovery equipment while the density of said liquid remains in said next density range of said liquid, said next vessel being labeled with said next liquid density range;
 h. repeating steps c) to g) until fermentation of said liquid is terminated in said fermentation vat, obtaining a plurality of containers labeled with liquid density ranges and filled with aromas emanating from the fermented liquid at the indicated densities;
 i. performing an aromatic profile for each vessel, identifying the liquid and its density range, constituting an aroma characterization of said beverage.

According to a preferred aspect of the invention, the step of making an aromatic profile for each vessel consists of:
 a. identifying aromatic fractions in said vessel; and
 b. giving a score for each aromatic fraction according to its intensity for each vessel, generating the aromatic profile of said aromas in said vessel;
 c. group the aromas according to the similarity of their aromatic profiles, into different labeled vessels indicating the different density ranges corresponding to the grouped aromas, to generate an aroma characterization according to a new preferred density range.

According to a preferred aspect of the invention, said step of making an aromatic profile is made by a panel of calibrated experts, for example using a sensory method such as a Quantitative Descriptive Analysis (QDA).

According to a preferred aspect of the invention, the step of making an aromatic profile for each vessel further comprises the step of performing a chemical characterization by extracting volatiles with SPME type fiber and gas chromatography analysis for each vessel.

According to a preferred aspect of the invention, said method further comprises the step of grouping the recovered aromas according to the similarity of their aromatic profiles through a Principal Component Analysis (PCA) and/or Hierarchical Ascendant Classification (Agglomerative Hierarchical Clustering—HAC) to generate said aromatic characterization of the beverage according to density range.

The present invention also consists of a method of producing an aroma-enriched beverage in fermentation vats, such as white wine, red wine, beer and juices, comprising the following steps:

a) providing an aromatic characterization of said beverage according to ranges of densities of the liquid within said fermentation vats.

b) connecting by means of a multiple connection system, a plurality of fermentation vats to at least one aroma recovery equipment;

c) measure the density of the liquid in each fermentation vat;

d) choosing a predetermined range of liquid density according to said aromatic characterization for said beverage;

e) selecting a set of vats of said plurality of fermentation vats having a liquid density contained within said predetermined range of liquid density;

f) feeding each aroma recovery equipment with the gas produced in said set of selected vats by actuating the multiple connection system of the fermentation vats;

g) storing the aroma recovered by each aroma recovery equipment in at least one vessel; and h) returning said recovered aroma to enrich the beverage in preparation, in said plurality of fermentation vats.

Example of the Invention

The method and systems of the present invention were applied in different wineries of Santa Rita Vineyard located in the commune of Palmilla, Chile.

Figure 1:
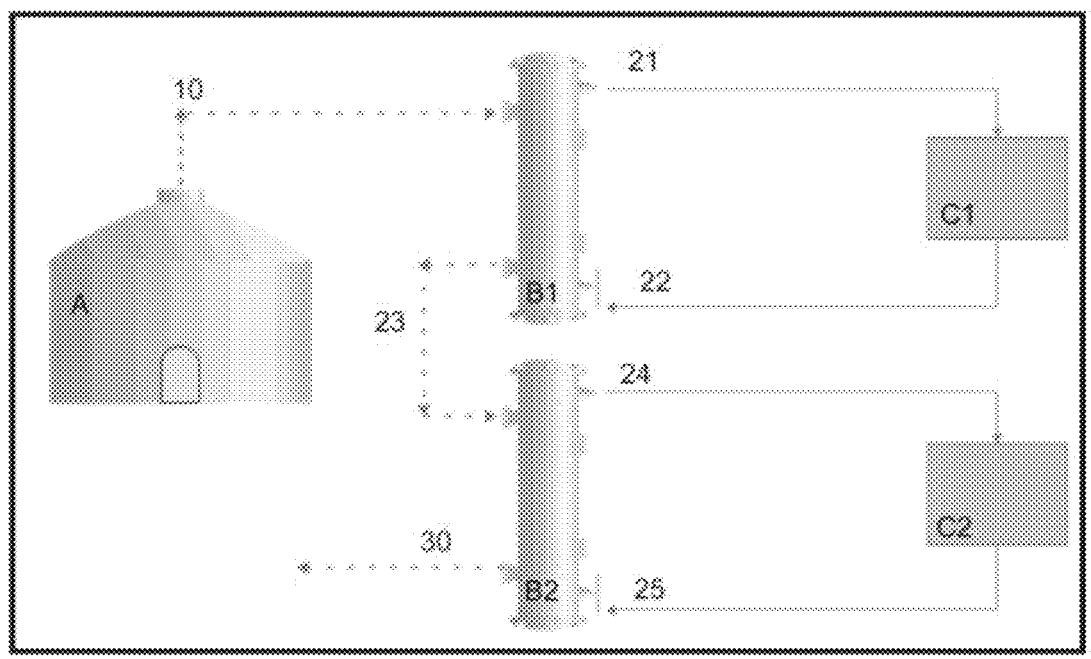
FIG. 1 schematically illustrates the aroma recovery system according to the invention, applied to a single vat in fermentation of white wine fermenting at a temperature between 15° C. and 30° C., where the requirements of cold and power can be observed.

In the scheme illustrated in FIG. 1, the power and cold requirements for an aroma recovery system according to the invention, applied to a single fermentation vat (A), with a white wine must, are observed, fermenting at a temperature between 15° C. and 30° C. This example shows that the gas emitted $CO_2$ (10) is taken from the fermentation vat (A) to be directed to a first heat exchanger (B1) operating cooling the $CO_2$ gas (10) at a temperature of around −10° C. by a first refrigerant circuit (21, 22) cooled to −15° C. in an heat exchanger of the first circuit (C1), then said $CO_2$ gas cooled (23) is led to a second heat exchanger (B2) to be cooled to a temperature of about −40° C. by a second refrigerant circuit (24, 25) cooled to −40° C. in the heat exchanger of the second circuit (C2) and then evacuated (30). From the first heat exchanger (B1), condensed water can be extracted with a aroma portion entrained by the condensation, this first heat exchanger (B1) requires to operate with the first refrigeration circuit (21, 22, B1, C1) with a heat extraction capacity of about 32 mW/Liter of must in the fermentation vat (A).

From the second heat exchanger (B2) the aroma condensed at −40° C. is withdrawn and stored in an appropriate vessel (not shown in FIG. 1), this second heat exchanger (B2) requires operation with the second heating circuit refrigeration (24, 25, B2, C2) with a heat extraction capacity of about 16 mW/Liter of must in the fermentation vat (A).

Then in this example of the system according to the invention, a power of 1600 watt for the first cooling cycle and a power of 800 Watt for the second cooling cycle are required for a 50,000 liter must fermentation vat.

The aroma recovery system of the present invention was tested in a cellar comprising 4 fermentation vats collecting a total of 30 liters of aroma at −40° C. for a period of 15 days, between Apr. 14 and 27, 2015.

The aroma recovery system of the present invention was tested with the connection system according to the invention covering a total of 46 fermentation vats of 50,000 liters of must of Sauvignon Blanc and Chardonnay strains. The final aroma recovery count in white wines amounts to approximately 430 liters of aroma of −40° C., for a period of 29 days, from 30 Mar. to 27 Apr. 2015.

The results of an applied example of the method according to the present invention, from a white wine must of strain of Sauvignon Blanc, fermenting at 18° C. in a fermentation vat with a capacity of 600 Liters are shown below; during two periods of, respectively, 8 days between the 6th and 13th of May 2013, and of 14 days between the 23rd of May and the 5th of June 2013.

An aromatic characterization of the white wine of the Sauvignon Blanc strain was carried out fermenting at 18° C. in the indicated periods, for which 10 samples of aromas stored in dedicated vessels, hereinafter called condensed, were extracted for each respective period, that is to say a total of 2 times the 10 aroma condensates according to the different densities of the must indicated below: Condensate 1 (F1) with density in the range of 1090 to 1077; Condensate 2 (F2) with density in the range of 1077 to 1069; Condensate 3 (F3) with density in the range of 1069 to 1061; Condensate 4 (F4) with density in the range of 1061 to 1053; Condensate 5 (F5) with density in the range of 1053 to 1045; Condensate 6 (F6) with density in the range of 1045 to 1037; Condensate 7 (F7) with density in the range of 1037 to 1029; Condensate 8 (F8) having a density in the range of 1029 to 1021; Condensate 9 (F9) with density in the range of 1021 to 1013 and condensate 10 (F10) with density in the range of 1013 to 995.

A Quantitative Descriptive Analysis (QDA) is used to generate the aromatic profiles of the extracted aromas in the 20 different condensates. For this purpose a panel of experts is trained to reliably identify and evaluate the fragrance fractions present in the condensates.

The condensates were stored at −80° C. until analyzed. The evaluation of the condensates to generate the aromatic profile, the aromatic and chemical characterization, was carried out after one year of being kept in test tubes.

The condensates were diluted with a hydro-alcoholic solution of 12% v/v, pH 3.2 and refrigerated at 4° C. A solution, 0.165% of 400 mL, is prepared. The atmosphere of the solution is purged with nitrogen ($N_2$), then sample aliquot is added and purged again with nitrogen atmosphere. The samples are stored in bottles protected with foil and stored at 4° C. until analyzed.

The expert panel consists of 8 judges (6 women and 2 men between 24 and 40 years old) with more than one year of experience, based on four requirements: motivation to participate in the study, availability, health and sensorial performance. Sensory performance is evaluated based on ISO8586-1: 1993.

The expert panel analyzes the condensates; with a nose sensorial analysis of the condensed at 25° C., evaluating the intensity of 12 aromatic fractions that were defined by a selection and reduction of 41 aromatic attributes describing a white wine based on geometric means (GM>10%) according to ISO standard 11035, 1994.

Panel experts evaluate the aromatic fractions from 0 to 9. The list of the aromatic fractions used for the evaluation is given in Table 1 below.

TABLE 1

Aromatic fraction, description and standard reference.

| Fraction - Romantic | Description | Standard reference |
|---|---|---|
| Pineapple (FA1) | Aroma of the pineapple, ester | Concentrated and frozen pineapple juice |
| Apple/pear (FA2) | Aroma of green apple, sweet fruit | Ethyl octanoate (2005 ppb) |
| Linalool (FA3) | Aroma of the floral lemon | Linalool (1000 ppm) |
| Banana (FA4) | Aroma of the banana, sweet fruit | Isoamyl acetate (30 ppb) |
| Passion fruit (FA5) | Aroma of passion fruit, gooseberry, guava | 3-mercaptohexylacetate (63.15 ng/L in ethanol) |
| Grape (AF6) | Aroma of the grape | Frozen natural fruit |
| Rose (FA7) | Aroma of flower, rose, honey | Phenylethyl alcohol (2000 ppb) |
| Grass (FA8) | Aroma of fresh grass, oil, green apple, wood | Hexanol (8000 ppb) |
| Humidity/clay (FA9) | Spoiled cork aroma, mold | 2,4,6-Tribromanisole (TBA) (30 ppt) |
| Mineral (FA10) | Aroma to rock, mineral, smoke | Benzenemethanolethiol (19 ppt in 10% ethanol/water) |
| Cat urine (FA11) | Smell of sweat, cat urine | 4-Mercapto-4-methyl-pentan-2-one (385.9 ng/L in ethanol) |
| Reduced (FA12) | Aroma of burning rubber | Reduced wine |

Evaluations were performed in a test room, Vine Santa Rita in Buin Chile, at a temperature regulated at 20° C. The temperature of the condensed during the evaluation was between 20 and 25° C. The results are shown in Table No. 2 below. The aromatic profiles of the condensates (F1 to F10) can be observed in FIG. 5.

Then flavorings condensates with similar aromatic profiles are grouped by Principal Component Analysis (PCA) and Ascendant Hierarchical Classification (AHC), for generating said aromatic characterization of the beverage, in this case white wine, Sauvignon Blanc, in a new range of densities.

Validation of such formed aromatic groups by sensory analysis by expert panel, Thiol analysis and analysis by gas chromatography mass spectrometer (GC-MS) and quantified by standard addition method are validated.

TABLE NO. 2

Result of sensory evaluation by expert panel.

| | \multicolumn{20}{c}{condensate #} |
|---|---|

| Aromatic Fraction | 10 M | 10 ST | 9 M | 9 ST | 8 M | 8 ST | 7 M | 7 ST | 6 M | 6 ST | 5 M | 5 ST | 4 M | 4 ST | 3 M | 3 ST | 2 M | 2 ST | 1 M | 1 ST |
|---|---|---|---|---|---|---|---|---|---|---|---|---|---|---|---|---|---|---|---|---|
| Pineapple | 4.9 | 1.6 | 4.2 | 1.9 | 5.2 | 1.9 | 6.0 | 1.5 | 6.5 | 1.6 | 5.6 | 1.6 | 6.6 | 1.3 | 6.2 | 1.6 | 5.0 | 2.1 | 4.1 | 1.5 |
| Apple pear | 4.6 | 1.6 | 4.4 | 1.9 | 4.6 | 1.6 | 5.3 | 1.7 | 5.7 | 1.4 | 5.2 | 1.6 | 5.8 | 1.5 | 5.7 | 1.7 | 4.8 | 1.7 | 4.3 | 1.8 |
| linalool | 2.1 | 1.5 | 2.2 | 1.5 | 2.5 | 1.7 | 2.9 | 1.9 | 2.5 | 1.8 | 2.8 | 1.5 | 3.1 | 1.9 | 2.2 | 1.6 | 2.8 | 1.7 | 2.1 | 1.6 |
| Banana | 4.1 | 2.1 | 3.7 | 1.4 | 4.2 | 1.7 | 4.2 | 1.3 | 4.5 | 1.2 | 4.4 | 1.6 | 4.3 | 1.4 | 4.3 | 1.0 | 3.7 | 1.4 | 3.2 | 1.8 |
| Passion fruit | 1.5 | 2.0 | 1.2 | 1.4 | 1.4 | 1.7 | 1.5 | 2.0 | 1.6 | 2.0 | 1.1 | 1.7 | 1.4 | 2.2 | 1.5 | 2.3 | 1.4 | 1.8 | 1.2 | 1.6 |
| Grape | 1.2 | 1.6 | 1.5 | 1.5 | 1.3 | 1.4 | 1.7 | 1.8 | 1.5 | 1.7 | 1.7 | 1.9 | 1.7 | 1.7 | 1.8 | 2.1 | 1.5 | 1.6 | 1.5 | 1.5 |
| Rose | 1.2 | 1.3 | 1.2 | 1.4 | 1.1 | 1.4 | 1.4 | 1.5 | 1.2 | 1.3 | 1.3 | 1.5 | 2.0 | 1.7 | 1.8 | 2.0 | 1.0 | 1.4 | 0.7 | 1.2 |
| Grass | 1.6 | 1.7 | 1.5 | 1.8 | 1.3 | 1.7 | 1.0 | 1.2 | 0.8 | 1.3 | 1.4 | 1.7 | 1.2 | 1.4 | 2.2 | 2.0 | 0.9 | 1.2 | 2.2 | 2.2 |
| Humidity/clay | 2.0 | 1.6 | 1.4 | 1.4 | 1.6 | 1.4 | 1.3 | 1.1 | 1.4 | 1.4 | 1.5 | 1.5 | 1.3 | 1.3 | 1.8 | 1.5 | 1.3 | 1.3 | 2.8 | 1.8 |
| Mineral | 2.1 | 1.7 | 2.0 | 1.6 | 2.2 | 1.5 | 1.6 | 1.1 | 1.6 | 1.0 | 2.1 | 1.4 | 2.1 | 1.4 | 2.2 | 2.0 | 1.8 | 1.5 | 2.9 | 1.5 |
| Cat urine | 0.6 | 1.1 | 0.5 | 0.9 | 0.4 | 0.7 | 0.2 | 0.4 | 0.3 | 0.6 | 0.1 | 0.5 | 0.4 | 1.0 | 0.5 | 1.0 | 0.4 | 0.8 | 0.4 | 0.7 |
| Reduced | 2.0 | 2.1 | 1.4 | 1.8 | 2.1 | 1.7 | 1.3 | 1.2 | 1.2 | 1.5 | 1.3 | 1.4 | 0.9 | 1.2 | 0.5 | 1.1 | 1.4 | 1.4 | 3.6 | 2.2 |

M = Average,
ST = Standard deviation.

Figure 5:
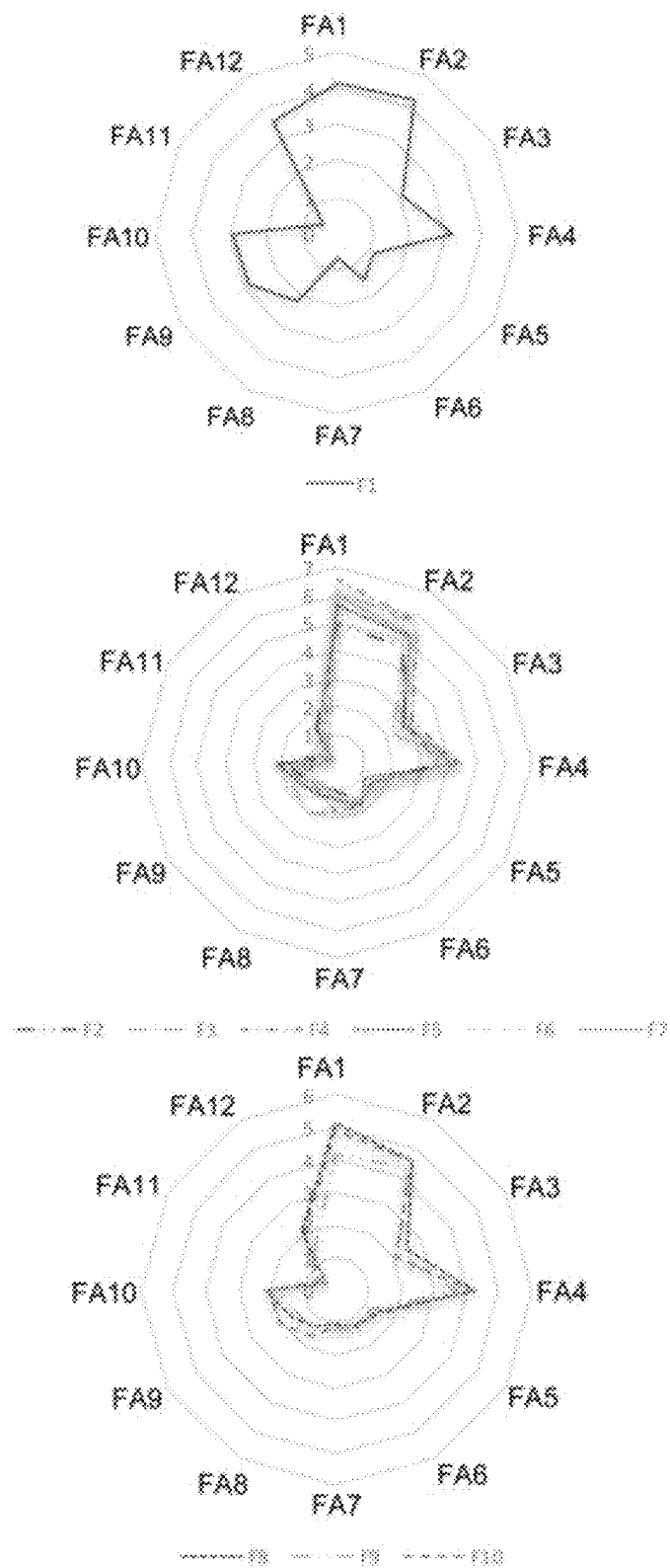
FIG. 5 illustrates graphs of the aroma profiles of the aroma condensates formed in the example of the present invention.
Figure 6:
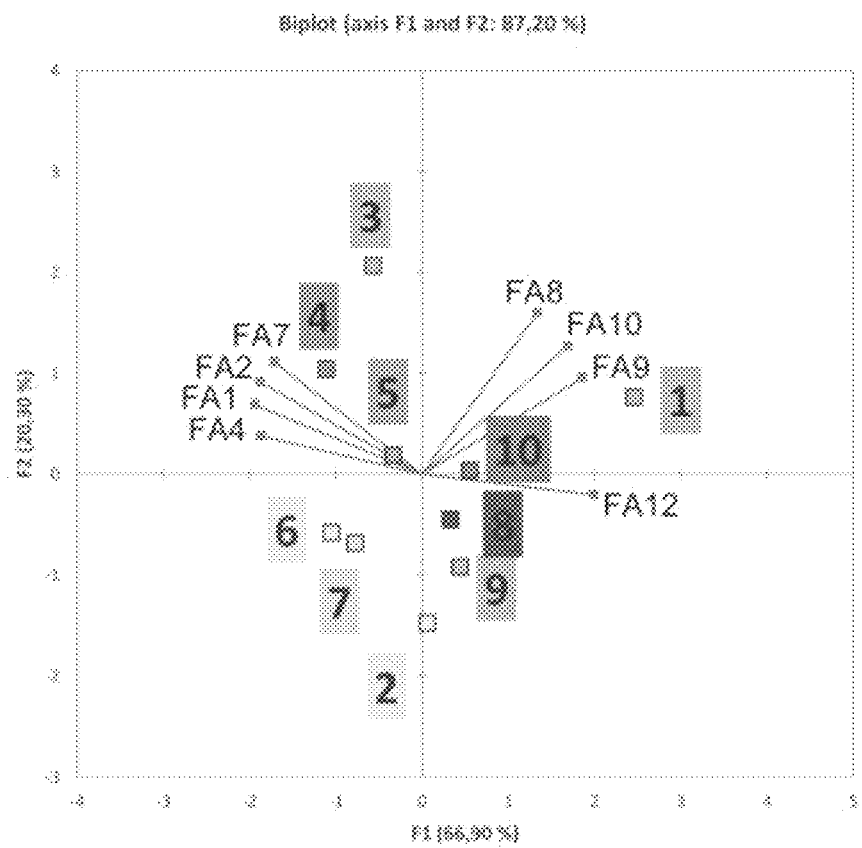
FIG. 6 illustrates a standard Principal Component Analysis graph for the example of the present invention.

It is noted, in FIG. 6, that the normalized principal component analysis (PCA) with the first two components (F1 and F2) representing 87.2% of the data in this FIG. 5, the aromatic fractions are identified by the references listed in the table 1 above indicated for the condensates from 1 to 10.

The analysis is supplemented with Pearson correlation test in that shown in Table No. 3 below.

TABLE NO. 3

Matrix coefficients (Pearson) form the sensory analysis of the condensates.

| | Pineapple | Apple pear | Banana | Rose | Grass | Humidity | Mineral | Reduced |
|---|---|---|---|---|---|---|---|---|
| Pineapple | 1 | 0.972 | 0.824 | 0.768 | −0.391 | −0.537 | −0.494 | −0.709 |
| Apple pear | 0.972 | 1 | 0.750 | 0.812 | −0.275 | −0.491 | −0.418 | −0.753 |
| Banana | 0.824 | 0.750 | 1 | 0.659 | −0.394 | −0.585 | −0.555 | −0.712 |
| Rose | 0.768 | 0.812 | 0.659 | 1 | −0.079 | −0.522 | −0.292 | −0.825 |
| Grass | −0.391 | −0.275 | −0.394 | −0.079 | 1 | 0.799 | 0.844 | 0.385 |
| Humidity | −0.537 | −0.491 | −0.585 | −0.522 | 0.799 | 1 | 0.871 | 0.811 |

TABLE NO. 3-continued

Matrix coefficients (Pearson) form the sensory analysis of the condensates.

|  | Pineapple | Apple pear | Banana | Rose | Grass | Humidity | Mineral | Reduced |
|---|---|---|---|---|---|---|---|---|
| Mineral | −0.494 | −0.418 | −0.555 | −0.292 | 0.844 | 0.871 | 1 | 0.664 |
| Reduced | −0.709 | −0.753 | −0.712 | −0.825 | 0.385 | 0.811 | 0.664 | 1 |

Bold values are different from 0 with a degree of significance alpha = 0.05

The matrix coefficients include relationships between aromatic fractions, which confirms the PCA analysis. From the above data, you can perform three groups of condensates or flavors.

Figure 7:
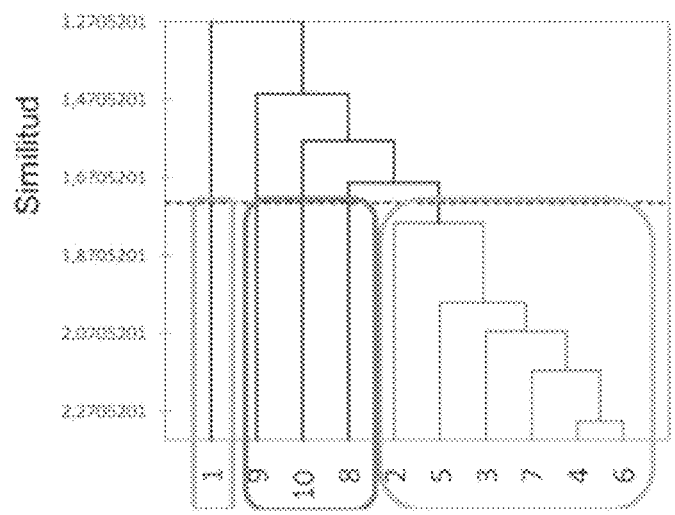
FIG. 7 illustrates a graph for a flavor grouping by Hierarchical Ascendant Classification for the example of the present invention

The Hierarchical Ascendant Classification (AHC) observed in the dendrogram of FIG. 7 is performed defining three groups of flavorings with the following distributions corresponding to different ranges of density must in fermentation:

Group 1 (AG1): condensates 8, 9 and 10, with density range 1029-995;

Group 2 (AG2): condensates 2, 3, 4, 5, 6 and 7, with a density range of 1077 to 1029; and Group 3 (AG3): condensate 1, with a density range from 1090 to 1077.

Figure 8:
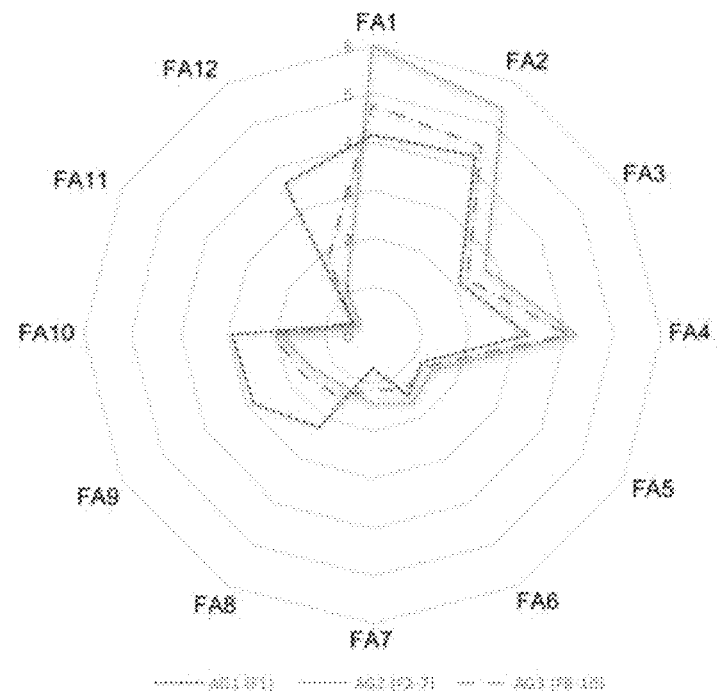
FIG. 8 shows a graph of an aromatic characterization of a beverage, according to an example of the present invention, corresponding to the aromatic profiles of the established flavor groupings.

Different groups of aromas are sensorially analyzed to obtain the corresponding aromatic profiles and define the aromatic characterization beverage under analysis, which can be seen in FIG. 8, by the expert panel, the results are given in sensory analysis of Table No. 4.

TABLE NO. 4

Results of sensory analysis in groups of aromas.

|  | Group 1 | | Group 2 | | Group 3 | |
|---|---|---|---|---|---|---|
|  | \multicolumn{6}{c}{Aromatic fraction} | | | | | |
|  | M | ST | M | ST | M | ST |
| Pineapple | 4.4 | 2.0 | 5.9 | 1.6 | 4.1 | 1.5 |
| Apple/pear | 4.5 | 1.8 | 5.5 | 1.8 | 4.3 | 1.8 |
| linalool | 2.4 | 1.3 | 2.7 | 1.3 | 2.1 | 1.6 |
| Banana | 4.4 | 1.9 | 4.8 | 1.7 | 3.2 | 1.8 |
| Passion fruit | 0.7 | 1.1 | 0.8 | 1.3 | 1.2 | 1.6 |
| Grape | 1.5 | 1.4 | 1.9 | 1.5 | 1.5 | 1.5 |
| Rose | 1.7 | 1.6 | 1.2 | 1.0 | 0.7 | 1.2 |
| Grass | 1.4 | 1.7 | 1.4 | 1.9 | 2.2 | 2.2 |
| Humidity/clay | 1.6 | 1.3 | 1.1 | 1.2 | 2.8 | 1.8 |
| Mineral | 1.7 | 1.7 | 0.9 | 1 9 | 2.9 | 1.5 |
| Cat urine | 0.6 | 0.9 | 0.5 | 0.8 | 0.4 | 0.7 |
| Reduced | 1.8 | 1.5 | 1.2 | 1.2 | 3.6 | 2.2 |

M = average;
ST = standard deviation

To validate the aromatic profiles based on the sensory analysis, chemical characterization and analysis of thiols of these three groups of aromas was performed, the results are shown below in Table No. 5 and 6 respectively.

TABLE NO. 5 chemical characterization results groups aromas.

| | Concentration ng (mg/1) | | |
|---|---|---|---|
| Aromatic component | Group 1 | Group 2 | Group 3 |
| 2 feniletanol | 82 ± 28 a | 4 ± 1 b | 2.0 ± 0.4 b |
| Ethyl acetate | 803 ± 48 a | 727 ± 49 a | 358 ± 37 b |
| Butanoate | 34 ± 3 a | 27 ± 1 a | 38 ± 1 a |
| Ethyl decanoate | 1161 ± 11 a | 2124 ± 264 a | 1378 ± 72 a |
| Hexanoate | 2466 ±140 a | 3250 ± 324 a | 1491 ± 90 a |
| Octanoate | 6153 ± 445 a | 8804 ± 701 a | 4654 ± 782 a |
| hexanol | 10 ± 2.1 a | 4 ± 0.2 b | 10 ± 0.3 a |
| Hexyl acetate | 3617 ± 126 a | 6640 ± 584 a | 2076 ± 118 a |
| Isoamyl Alcohol | 14 ± 1 a | 13 ± 1 a | 10 ± 1 a |
| Isoamyl acetate | 3869 ± 483 a | 2972 ± 383 a | 4176 ± 383 a |
| isobutyl acetate | 36 ± 1 a | 38 ± 2a | 26 ± 3 a |

TABLE 6

Results of analysis of the aromatic groups thiols

| | Concentration ng (mg/1) | | |
|---|---|---|---|
| Aromatic component | Group 1 | Group 2 | Group 3 |
| 3-mercapthexanol 3MH | 128 ± 30 | 108 ± 13 | 97 ± 2 |
| Ethyl 3-mercaptohexyl (A3MH) | ND | 9 ± 1 | ND |

Figure 9:
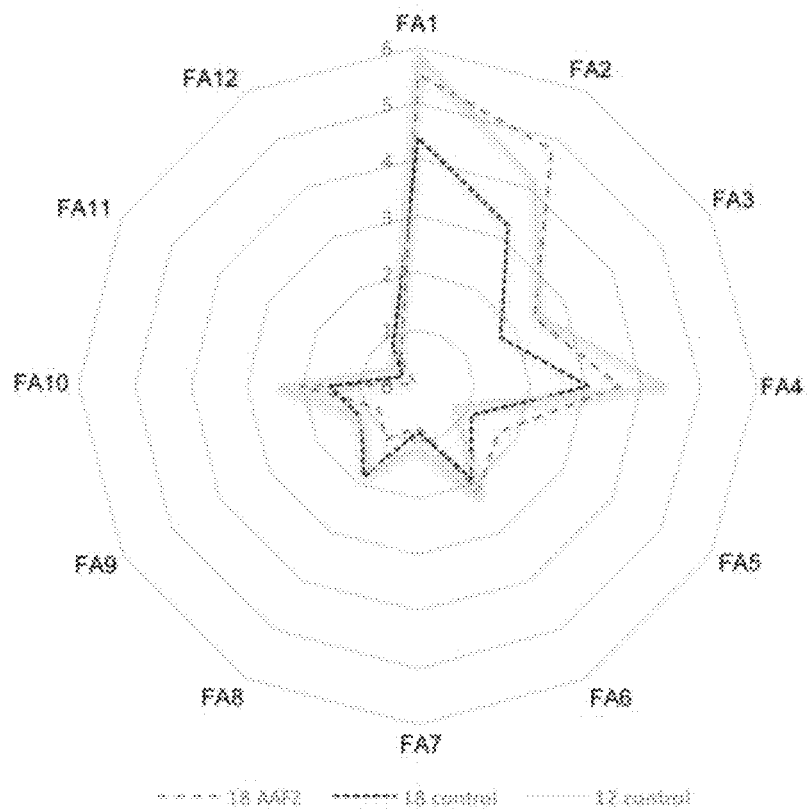
FIG. 9 illustrates a graph of aromatic profiles of different wines, including a wine enriched with the method according to the present invention.

The results of sensory analysis over the aromatic groups allow obtaining a set of aromatic profiles according density fermentation, which constitutes the aromatic characterization of the beverage, in this example, white wine Sauvignon Blanc fermented at 18° C., as it is illustrated in FIG. 9.

After obtaining this aromatic characterization, it is possible proceeding the enriching of a wine with recovered flavors, increasing its quality. In this example, we proceeded to add the aromatic group No. 2, a fermented must at 18° C. and compared with wine fermented must at 12° C., which is known for higher quality but much slower in fermentation. The graph shown in FIG. 9 allows observing the similarities of aromatic profiles obtained from the wines. It is noted that adding the aromatic group 2 to the fermented must at 18° C. wine is obtained with an aromatic profile very similar to wine from fermented must just at 12° C. As it noted, the quality of the wine increased through the method and system of the present invention.

Therefore, it is possible fermenting at higher temperatures without losing the wine quality. This would imply an increase of about 25% in production capacity and about 30% energy savings.

It is noteworthy that although the example of the present invention has been characterized in particular for a wine, analogously, the drag of aroma phenomenon occurs in other fermentation processes such as beer and juices.

The invention claimed is:

1. A method of recovering aroma from fermentation vats, wherein the method comprises the following steps:
   a) connecting, by means of a multiple connection system, a gas outlet of each of a plurality of fermentation vats to at least one aroma recovery equipment;

b) measuring the density of the fermentation must in each fermentation vat;

c) choosing a density range of the fermenting must according to said an aromatic characterization of aroma condensates;

d) selecting a set of vats of the plurality of fermentation vats having a fermenting must density within said density range of the fermenting must;

e) feeding, by means of the multiple connection system, the at least one aroma recovery equipment with a gas produced in said set of selected vats, f) storing an aroma condensate recovered by the at least one aroma recovery equipment in at least one vessel;

g) labeling said at least one vessel according to said aromatic characterization.

2. The method of recovering aroma according to claim 1, wherein aromatic characterization is obtained following the steps of:

1) connecting an aroma recovery equipment to fermentation vats with a fermenting must;

2) connecting an aroma storage vessel to said aroma recovery equipment;

3) measuring the density of the fermenting must in said fermentation vat over a certain period of time;

4) extracting the gas produced by the fermenting must in said fermentation vat with said aroma recovery equipment;

5) storing in said aroma storage vessel an aroma condensate recovered from the extracted gas by said aroma recovery equipment while the density of the fermenting must is within the chosen density range said aroma storage vessel being labeled with said density range of the fermenting must;

6) repeating steps 3) to 5) until the density of the fermenting must reaches a next density range of the fermenting must, withdrawing the aroma storage vessel connected to said aroma recovery apparatus and connecting a next aroma storage vessel to said aroma recovery apparatus;

7) storing in said next aroma storage vessel an aroma condensate recovered from the extracted gas by said aroma recovery equipment while the density of the fermenting must remains in said next density range of the fermenting must, said next aroma storage vessel being labeled with said next density range of the fermenting must;

8) repeating steps 3) to 7) until fermentation of said fermenting must is terminated in said fermentation vat, obtaining a plurality of aroma storage vessels labeled with density ranges of the fermenting must and filled with aroma condensates recovered from the fermenting must at the labelled density ranges;

9) performing an aromatic profile for each labelled aroma storage vessel, corresponding to the aroma characterization.

3. The method of recovering aroma according to claim 2, wherein the step of performing an aromatic profile for each labelled aroma storage vessel include:

i. identifying aromatic fractions in the labelled aroma storage vessel; and ii. giving a score for each aromatic fraction according to an intensity of each aromatic fraction for each labelled aromatic storage vessel, generating the aromatic profile of the aroma condensates in the labelled aroma storage vessels;

iii. grouping the recovered aroma condensates according to the similarity of their aromatic profiles, into different labeled aroma storage vessels indicating the different density ranges of the fermentation must corresponding to the grouped, aroma condensates to generate an aromatic characterization according to new preferred density ranges.

4. The method of recovering aroma according to claim 3, wherein said step of performing an aromatic profile is made by an expert panel using a quantitative descriptive analysis sensory method.

5. The method of recovering aroma according to claim 3, wherein the step of performing an aromatic profile for each labelled aroma storage vessel further comprises the step of performing a chemical characterization of the aromatic profile by gas chromatography analysis for each labelled aromatic storage vessel.

6. The method of recovering aroma according to claim 3, wherein the step of grouping the recovered aromas according to the similarity of their aromatic profiles uses statistical methods selected from Principal Component Analysis (PCA) and/or Hierarchical Ascendant Classification (Agglomerative Hierarchical Clustering—HAC) to generate said aromatic characterization of the aromatic condensates according to density range of the fermentation musts.

7. A method for producing aroma enriched beverages in fermentation vats, comprising the following steps:

a) generating an aromatic characterization of aroma condensates according to density ranges of densities of fermenting must within a plurality of fermentation vats;

b) connecting, by means of a multiple connection system, a gas outlet of each of the plurality of fermentation vats to at least one aroma recovery equipment;

c) measuring the density of the fermenting must in each fermentation vat;

d) choosing a density range of the fermenting must according to said aromatic characterization of aroma condensates;

e) selecting a set of vats of said plurality of fermentation vats having a fermenting must density within said density range of the fermenting musts;

f) feeding, by means of the multiple connection system, each aroma recovery equipment with a gas produced in said set of selected vats;

g) storing the aroma recovered by the at least one aroma recovery equipment in at least one vessel; and h) returning said recovered aroma to said plurality of fermentation vats enriching the aroma of a beverage to be prepared.

* * * * *